(12) United States Patent
Anderson et al.

(10) Patent No.: US 10,919,507 B2
(45) Date of Patent: Feb. 16, 2021

(54) PEDAL-FORCE SIMULATOR DEVICE

(71) Applicant: Robert Bosch GmbH, Stuttgart (DE)

(72) Inventors: Chris Anderson, Paris (FR); Juergen Vogg, Kempten (DE); Matthias Kistner, Bretzfeld (DE); Raynald Sprocq, Esbly (FR); Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 16/095,600

(22) PCT Filed: Mar. 8, 2017

(86) PCT No.: PCT/EP2017/055453
§ 371 (c)(1),
(2) Date: Oct. 22, 2018

(87) PCT Pub. No.: WO2017/202512
PCT Pub. Date: Nov. 30, 2017

(65) Prior Publication Data
US 2019/0126898 A1    May 2, 2019

(30) Foreign Application Priority Data
May 24, 2016    (DE) ..................... 10 2016 208 942.0

(51) Int. Cl.
*B60T 13/14*    (2006.01)
*B60T 8/40*    (2006.01)
(Continued)

(52) U.S. Cl.
CPC ............ *B60T 8/3255* (2013.01); *B60T 7/042* (2013.01); *B60T 8/409* (2013.01)

(58) Field of Classification Search
CPC ......... B60T 8/3255; B60T 8/409; B60T 7/042
See application file for complete search history.

(56) References Cited

U.S. PATENT DOCUMENTS 2,796,856 A * 6/1957 Gratzmuller ............ F16H 19/04
123/179.31
3,317,252 A * 5/1967 Gassman ................ B60T 13/18
303/54

(Continued)

FOREIGN PATENT DOCUMENTS

CN    102107656 A    6/2011
CN    104973038 A    10/2015
(Continued)

OTHER PUBLICATIONS

International Search Report for PCT/EP2017/055453, dated May 24, 2017.

*Primary Examiner* — Melody M Burch
(74) *Attorney, Agent, or Firm* — Norton Rose Fulbright US LLP; Gerard Messina

(57) ABSTRACT

A pedal-force simulator device is described as having a housing in which an actuable pressure plunger is mounted in an axially displaceable manner, and having at least two coil springs, which are disposed parallel to one another between an end face of the pressure plunger and an axial stop of the housing. It is provided that at least one disk spring is interposed between the coil springs and the axial stop and/or between the coil springs and the pressure plunger in each case.

17 Claims, 1 Drawing Sheet

(51) Int. Cl.
*B60T 8/32* (2006.01)
*B60T 7/04* (2006.01)

(56) References Cited

U.S. PATENT DOCUMENTS

| | | | | |
|---|---|---|---|---|
| 4,702,431 A | * | 10/1987 | Kaneko | A41H 1/02 |
| | | | | 242/246 |
| 4,916,951 A | * | 4/1990 | Messner | B30B 15/028 |
| | | | | 72/455 |
| 5,205,572 A | * | 4/1993 | Buell | B62K 25/04 |
| | | | | 280/284 |
| 5,447,362 A | * | 9/1995 | Nagano | B60B 27/023 |
| | | | | 301/110.5 |
| 6,347,518 B1 | | 2/2002 | Kingston et al. | |
| 7,357,465 B2 | | 4/2008 | Young et al. | |
| 2008/0223670 A1 | | 9/2008 | Toyohira et al. | |
| 2009/0014930 A1 | * | 1/2009 | Kuzukawa | F16F 13/10 |
| | | | | 267/140.13 |
| 2012/0007419 A1 | * | 1/2012 | Sellinger | B60T 8/4077 |
| | | | | 303/15 |
| 2014/0360177 A1 | * | 12/2014 | Ryu | B60T 8/4081 |
| | | | | 60/556 |
| 2016/0031424 A1 | * | 2/2016 | Weh | B60T 8/409 |
| | | | | 60/533 |

FOREIGN PATENT DOCUMENTS

| | | |
|---|---|---|
| DE | 102014211481 A1 | 12/2015 |
| JP | 2015182577 A | 10/2015 |
| WO | 2004080772 A1 | 9/2004 |

\* cited by examiner

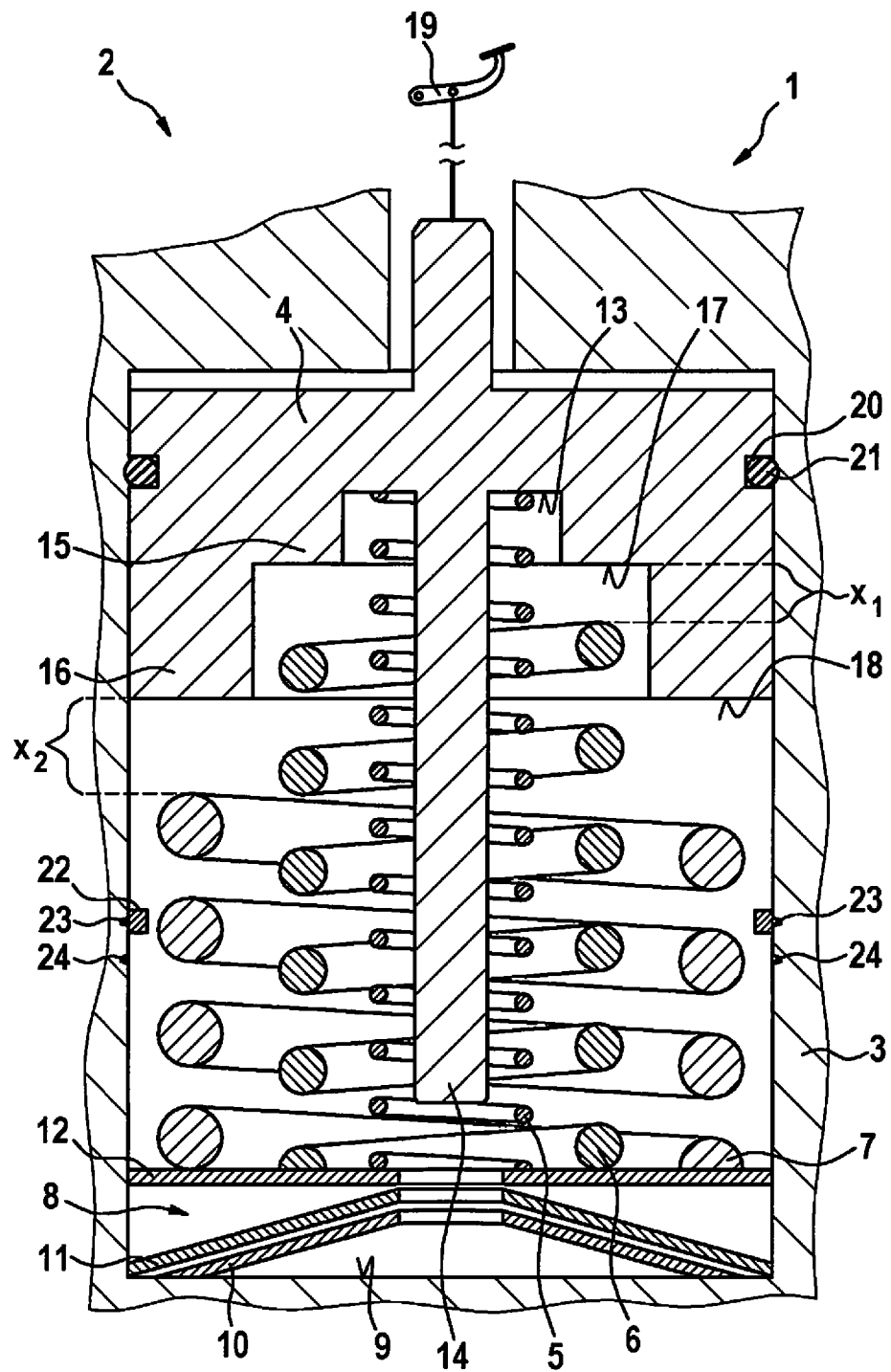

PEDAL-FORCE SIMULATOR DEVICE

FIELD OF THE INVENTION

The present invention relates to a pedal-force simulator device, which has a housing in which an actuable pressure plunger is mounted in an axially displaceable manner; it also has at least two coil springs, which are disposed parallel to one another between an end face of the pressure plunger and an axial stop of the housing.

In addition, the present invention relates to a vehicle, in particular a motor vehicle, which has such a pedal-force simulator device.

BACKGROUND INFORMATION

Pedal-force simulator devices of the type mentioned in the introduction are known from the related art. As a rule, they are used in vehicles that are equipped with electronic brake systems, which are also known as brake-by-wire brake systems. In this case the pedal-force simulator device simulates or generates a restoring force on the brake pedal in response to an operation of the brake pedal by a driver of the vehicle. The generated restoring force simulates a brake-pedal force feel that is familiar to the driver from driving a vehicle having a conventional, hydraulic brake system. U.S. Pat. No. 6,347,518 shows a pedal-force simulator device that has three coil springs which are disposed parallel to one another and are situated between an end face of an axially displaceable pressure plunger and an axial stop of a housing of the pedal-force simulator device. In response to an operation of the brake pedal, the pressure plunger is shifted in such a way that it compresses a first coil spring, and after a further deflection of the pressure plunger, the first coil spring and a second coil spring are jointly compressed, and after another deflection of the pressure plunger, the first coil spring, the second coil spring, and a third coil spring are jointly compressed. A resulting restoring force, which counteracts a further operation of the brake pedal and thereby simulates the brake-pedal force feel, is generated as a function of the simultaneously compressed coil springs. U.S. Pat. No. 7,357,465 describes another pedal-force simulator device.

SUMMARY

According to the present invention, at least one disk spring is interposed between the coil springs and the axial stop and/or between the coil springs and the pressure plunger in each case. The pedal-force simulator device according to the present invention has the advantage that the disk spring is easy to produce, takes up little space and is able to be acted upon by a high pressure force. The disk spring is generally developed in the form of a truncated cone having a small axial extension so that it is able to be placed in a housing of the pedal-force simulator device without taking up much space. In addition, it usually has high mechanical preloading so that the disk spring will experience only a slight deflection when a high pressure force is exerted and generate a high restoring force at the same time. A spring system made up of at least one coil spring and at least one disk spring thus makes it possible that when the coil spring has already been fully compressed by the pressure plunger and generates a maximum restoring force, an additional restoring force is generated by the disk spring. This improves the brake-pedal force feel, in particular during brake operations in which a driver operates a brake pedal of a vehicle to be decelerated with great force.

According to a preferred further development of the present invention, it is provided that at least one further disk spring is resting on the at least one disk spring, so that the disk springs form a stacked disk-spring system, the disk spring and the at least one further disk spring being aligned in parallel and/or in a mirror-inverted manner relative to each other. Combining at least two disk springs situated on top of each other offers the advantage of allowing for an adjustment of a resulting spring stiffness of the disk springs. Accordingly, a disk spring is stiffer the less it is elastically deformable as a function of a force, in particular a pressure force, that is acting upon it. If two disk springs lie in parallel on top of each other, then they are stacked on top of each other in the same direction. The lateral surface of the upper disk spring preferably lies on the lateral surface of the disk spring situated underneath. For example, two disk springs disposed parallel to each other in such a way have a greater spring stiffness than a single disk spring. If a disk spring is disposed in a mirror-inverted manner relative to the other disk spring, then the disk springs are stacked on top of each other in alternating directions. Two disk springs disposed on top of each other in a mirror-inverted manner have a lower spring stiffness as a whole than a single disk spring. If a single disk spring and two disk springs disposed in a mirror-inverted manner relative to each other are acted upon by the same pressure force, then the disk springs disposed in a mirror-inverted manner will be deflected further than the single disk spring. Through the placement of the disk springs, it is therefore possible to predefine different spring stiffnesses or spring characteristics having different gradients. In order to minimize mechanical friction, disk springs stacked in parallel and aligned in parallel preferably include lubricants such as lubricating oils on their lateral surfaces.

In a particularly preferred manner, it is provided that the respective disk spring includes metal, a metal alloy and/or plastic. This advantageously ensures that the disk spring is produced from a mechanically loadable and elastically deformable material such as spring steel, which has a long service life. A suitable material is spring steel, for example. The materials preferably have additional properties such as corrosion resistance and/or a high temperature stability.

According to a preferred further development of the present invention, it is provided that in the relaxed state of the coil springs or in the neutral state of the pressure plunger, at least one of the coil springs is disposed at an axial distance from the end face of the pressure plunger and/or from the axial stop. This has the advantage that the coil springs are compressed one after the other during an actuation of the pressure plunger and thus clearly influence the spring characteristic. In particular, the resulting spring stiffness is a function of the axial lengths and of the spring constants of the coil springs. The spring constants may be constant and/or variable. For example, if a single coil spring that has a constant spring constant is deflected by the pressure plunger, then the pressure force at which the pressure plunger exerts pressure on the coil spring responds proportionally to the deflection. If a second coil spring, which likewise has a constant spring constant, is subsequently deflected, then the respective spring constants are superimposed starting at the instant at which the first and the second coil springs are jointly deflected. The characteristic between pressure force and deflection deviates from the proportional characteristic of the only single deflected coil spring. As a result, a combination of coil springs and disk springs makes it possible to generate all kinds of spring stiffnesses or to obtain spring characteristics such as progressive spring characteristics.

In an especially preferred manner, it is provided that the coil springs are disposed coaxially with respect to one another. This offers the advantage that the placement of the coil springs in the housing of the pedal-force simulator device requires particularly little space. For this purpose, the diameter of the coil springs is preferably selected such that the respective adjacent coil springs are freely disposed and are situated at a predefinable radial distance from one another. Alternatively, the diameters of the coil springs are selected in such a way that the outer diameter of a coil spring situated coaxially on the inside and the inner diameter of a coil spring situated coaxially on the outside overlap at least partially in the axial direction. For example, this ensures that even at a slight deflection of an inner, longer coil spring, an outer, shorter coil spring will be deflected at the same time even before the outer coil spring itself is acted upon by a pressure force with the aid of the pressure plunger.

According to a preferred further development of the present invention, it is provided that coil springs that are situated coaxially with respect to one another are coiled in opposite directions. This ensures that an entangling of the coil springs during an actuation of the coil springs is avoided, which in particular prolongs their service life and ensures a correct operation of the pedal-force simulator device.

It is preferably provided that the end face of the pressure plunger has at least one axially projecting, especially annular stop shoulder, which is allocated to the coil spring disposed at an axial distance. This offers the advantage of reducing the deflection of the pressure plunger at which the pressure plunger applies a pressure force to at least two coil springs of different lengths. It is therefore possible that even a slight deflection of the pressure plunger results in a great spring stiffness. It is also possible to provide coil springs that have the same length but stop shoulders whose lengths differ, which means that a successive actuation of the individual coil springs is possible in this instance. The axial length of the stop shoulder corresponds at least essentially to the distance between the end face of the pressure plunger and the respective coil spring set axially apart. Alternatively, it is possible to place the stop shoulder(s) on the axial stop.

According to a preferred further development of the present invention, a stop is provided, which restricts the movement of the pressure plunger in the direction of the axial shoulder. This has the advantage that the coil springs and the disk springs are able to be compressed only to a limited extent as a function of a position of the stop, which means that a maximum spring travel is adjustable in this manner. For example, a complete compression of the coil springs and/or of the at least one disk spring is thereby avoided. The stop is preferably disposed as a stop ring along an inner housing wall of the housing of the pedal-force simulator device so that the pressure plunger, in particular its outer diameter, touches the stop ring following a deflection that reaches the stop ring. In addition, the stop ring is preferably disposed so as to be shiftable in the axial direction. This is possible, for example, by screwing the stop to the housing, in which case at least two threaded holes are disposed on the housing wall of the housing at a distance in the axial direction, so that the stop ring may be placed in different positions within the housing. Alternatively, the stop is developed in one piece with the inner housing wall or attached thereto in an integral fashion, such as by soldering, welding or bonding, in particular.

In an especially preferred manner, it is provided that the pressure plunger has a rod which centrically extends from its end face in the axial direction, as a stop that restricts a movement of the pressure plunger in the axial direction. This offers the advantage that the rod requires little space inside the housing due to its centrical placement. The rod preferably extends coaxially through the coil spring so that the coil spring is guided on the rod. This ensures greater stability of the coil-spring system. The diameter of the rod is preferably selected so that a radial clearance exists between the rod and the inner diameter of the guided coil spring, thereby minimizing mechanical friction between the rod and the coil spring. Additionally or alternatively, the disk spring has a recess to accommodate at least a portion of the rod so that the rod is able to touch the axial stop of the housing. Preferably, the diameter of the recess at least essentially corresponds to the diameter of the rod.

The brake system for a vehicle, in particular a motor vehicle, according to the present invention, is characterized by a pedal-force simulator device, which results in the previously mentioned advantages.

BRIEF DESCRIPTION OF THE DRAWING

The single FIGURE shows a simplified side view of a pedal-force simulator device according to an exemplary embodiment.

DETAILED DESCRIPTION

The single FIGURE shows a pedal-force simulator device 1 of a vehicle 2, which is not shown here, having a housing 3, which includes an actuable, axially displaceable pressure plunger 4, a first coil spring 5, a second coil spring 6, a third coil spring 7, and a disk-spring system 8. Disk-spring system 8 is interposed between coil springs 5, 6, 7 and an axial stop 9 situated at the bottom of housing 3.

Disk-spring system 8 has a first disk spring 10 and a second disk spring 11, the second disk spring 11 resting in parallel on first disk spring 10. An especially metallic bearing plate 12, which is displaceable in the axial direction, is disposed on second disk spring 11. On the one hand, it serves as a support surface for coil springs 5, 6, 7, and on the other hand it ensures that a pressure force exerted by pressure plunger 4 on coil springs 5, 6, 7 is transferred to disk-spring system 8 in a uniform manner.

Coil springs 5, 6, 7 are disposed coaxially to one another and have different lengths, diameters and, according to the exemplary embodiment, different constant spring constants in each case, and at least one of coil springs 5, 6, 7 may alternatively possibly have a variable spring constant. Longest coil spring 5 is preloaded between an end face 13 of pressure plunger 4 and bearing plate 12, while coil springs 6, 7 are axially set apart from end face 13 of pressure plunger 4. In order to avoid entangling during a compression or decompression of coil springs 5, 6, 7, coil spring 6 is wound in the opposite direction from coil spring 5, and coil spring 7 is wound in the opposite direction from coil spring 6.

End face 13 of pressure plunger 4 has a first stop shoulder 15 including an end face 17, and a second stop shoulder 16 having an end face 18. The in particular annular stop shoulder 15 is allocated to coil spring 6 axially set apart from it, and the in particular annular stop shoulder 16 is allocated to coil spring 7 axially set apart from it.

The axial length of stop shoulder 15 is preferably selected in such a way that end face 17 of stop shoulder 15 and its allocated coil spring 6 have a predefinable distance from each other, the distance of end face 17 from coil spring 6 being denoted by $x_1$. In the same way, the axial length of stop shoulder 16 is preferably selected so that end face 18 of stop shoulder 16 and its allocated coil spring 7 have a predefinable distance from each other, the distance of end face 18 from coil spring 7 being denoted by $x_2$, and distance $x_2$ is preferably greater than distance $x_1$. Stop shoulders 15, 16 ensure that the axial deflection of pressure plunger 4, at which pressure plunger 4 simultaneously applies a pressure force to the three coil springs 5, 6, 7 is reduced. As a result, it is possible that a great spring stiffness already results from a slight deflection of pressure plunger 4.

Pressure plunger 4 has a rod 14, which centrically extends through coil spring 5 from end face 13 of pressure plunger 4 in the direction of axial stop 9 and which restricts a movement of pressure plunger 4 in the axial direction. To enable rod 14 to cooperate with axial stop 9 of housing 3, disk-spring system 8, in particular disk springs 10, 11 and bearing plate 12, have a central recess in each case, or have an inner diameter that at least essentially corresponds to the diameter of rod 14.

When a brake pedal 19 of vehicle 2 is operated by a force, pressure plunger 4 is deflected and exerts a pressure force on coil spring 5, which compresses it. The greater the force by which brake pedal 19 is operated, the greater the pressure force that is acting upon coil spring 5 through pressure plunger 4. Because coil spring 5 has a constant spring constant, its deflection is initially proportional to the pressure force.

As soon as the deflection of pressure plunger 4 overcomes distance $x_1$, first coil spring 5 and second coil spring 6 are jointly compressed. The spring constants of coil springs 5, 6 are superimposed on one another in such a way that a resulting spring stiffness becomes greater, so that a further deflection of the coil springs is possible only at a pressure force that is greater than the pressure force currently exerted on the only one coil spring 5.

If pressure plunger 4 subsequently also overcomes distance $x_2$ due to the deflection, then first coil spring 5, second coil spring 6, and third coil spring 7 are jointly compressed. The resulting spring stiffness increases once again.

Even during the compression of first coil spring 5, the pressure force exerted by pressure plunger 4 is acting also on disk-spring system 8. However, disk springs 10, 11 are preferably preloaded to such a degree that disk springs 10, 11 are deflected only when the pressure force is great enough to compress all three coil springs 5, 6, 7. A further, minimal deflection of pressure plunger 4 then requires a maximum pressure force by pressure plunger 4 on coil springs 5, 6, 7 and disk-spring system 8. This has the result that a maximum restoring force acts on brake pedal 19 only near an end stop of brake pedal 19 and thereby simulates a brake-pedal force feel that corresponds to the brake-pedal force feel of a vehicle equipped with a conventional, hydraulic brake system.

As an alternative to rod 14, it is possible to provide a stop 22 that restricts the movement of pressure plunger 4 and is situated in the form of a stop ring on the inner housing wall of housing 3. Stop 22 is fixed in place on housing 3 with the aid of a screw-fitting device 23 and is situated so as to be shiftable, preferably in the axial direction, e.g., with the aid of an affixation with the aid of a further screw-fitting device 24.

Alternatively, it is possible to develop pressure piston 4 without shoulders 15, 16. This increases clearances $x_1$ and $x_2$ so that a joint compression of coil springs 5, 6, 7 sets in only after a greater deflection of pressure plunger 4. It is also possible to develop coil springs 5, 6, 7 at an identical length, whereby coil springs 5, 6, 7 are jointly compressed in response to a deflection of pressure plunger 4.

In addition, at least one third disk spring, which is not shown here, may be disposed on disk spring 11 as a mirror image to disk spring 11. This allows for an adaptation of a resulting spring stiffness or a spring characteristic. Both the at least one third disk spring and spring disks 10, 11 are preferably made from metal, a metal alloy and/or plastic.

As an alternative or in addition, it is possible to dispose a further disk-spring system, which is not shown here, including a bearing disk between coil springs 5, 6, 7 and pressure plunger 4. To do so, end face 13 of the pressure plunger is preferably developed without stop shoulders 15, 16 in order to ensure a more optimal support of the further disk-spring system on pressure plunger 4. Coil spring 5 is preferably preloaded between the further disk-spring system and axial stop 9 or between the further disk-spring system and disk-spring system 8 so that coil spring 5 presses the further disk-spring system against pressure plunger 4 by way of a frictional connection. A form-locking or an intermaterial fastening of the further disk-spring system on pressure piston 4 is also possible.

Between an inner housing wall of housing 3 and an outer lateral surface area of pressure plunger 4, pressure plunger 4 preferably has a radial recess 20 in which a sealing ring 21 is disposed.

Sealing ring 21 is preferably elastically preloaded between the housing inner wall of housing 3 and the wall side of recess 20 that lies opposite the housing inner wall.

The described specific embodiments may be combined as desired and are not restricted to the mentioned exemplary embodiments. With the aid of the described pedal-force simulator device 1, different spring characteristics or spring stiffnesses are realizable for the purpose of generating a brake-pedal force feel that corresponds to hydraulic braking. In particular in an end-stop range, when brake pedal 19, and thus pressure plunger 4, are nearly completely deflected, high end forces or restoring forces may be generated at brake pedal 19 and improve the brake-pedal force feel. Pedal-force simulator device 1, for example, may be used in all electro-hydraulic brake systems that are partially or fully able to be operated using a brake-by-wire brake system.

What is claimed is:

1. A pedal-force simulator device, comprising:
   an actuable pressure plunger;
   a housing in which the pressure plunger is mounted in an axially displaceable manner;
   at least two coil springs disposed parallel to one another between an end face of the pressure plunger and an axial stop of the housing; and
   at least one first disk spring interposed at least one of between: (i) the coil springs and the axial stop, and (ii) the coil springs and the pressure plunger, so that there is a physical contact between the at least one first disk spring and the coil springs;
   wherein to avoid entangling during a compression or a decompression of the at least two coil springs, one of the coil springs is wound in an opposite direction from another of the coil springs, and
   wherein the at least two coil springs includes three coil springs, wherein the longest coil spring has the smallest diameter, and wherein the longest coil spring having the smallest diameter is wound in a same direction as one of the coil springs having the largest diameter.

2. The pedal-force simulator device as recited in claim 1, further comprising:

at least one further disk spring sitting on the at least one first disk spring so that the at least one further disk spring and the at least one first disk spring form a stacked disk-spring system, wherein the at least one further disk spring and the at least one first disk spring are aligned at least one of in parallel and in a form of mirror images relative to each other.

3. The pedal-force simulator device as recited in claim 1, wherein the at least one disk spring includes at least one of a metal, a metal alloy, and a plastic.

4. The pedal-force simulator device as recited in claim 1, wherein one of in a relaxed state of the coil springs and in a non-actuated state of the pressure plunger, at least one of the coil springs is disposed axially at a distance at least one of from the end face of the pressure plunger and from the axial stop.

5. The pedal-force simulator device as recited in claim 1, wherein the coil springs are coaxially disposed relative to one another.

6. The pedal-force simulator device as recited in claim 1, wherein the end face of the pressure plunger has at least one axially projecting stop shoulder that is allocated to an axially spaced apart one of the coil springs.

7. The pedal-force simulator device as recited in claim 1, further comprising:
a further stop that restricts a movement of the pressure plunger in a direction of the axial stop.

8. The pedal-force simulator device as recited in claim 1, wherein the pressure plunger includes a stop, and a rod that centrically extends from the end face in an axial direction and that restricts a movement of the pressure plunger in the axial direction.

9. A brake system for a vehicle, comprising:
a pedal-force simulator device, including:
an actuable pressure plunger;
a housing in which the pressure plunger is mounted in an axially displaceable manner;
at least two coil springs disposed parallel to one another between an end face of the pressure plunger and an axial stop of the housing; and
at least one first disk spring interposed at least one of: between: (i) the coil springs and the axial stop, and (ii) the coil springs and the pressure plunger, so that there is a physical contact between the at least one first disk spring and the coil springs;
wherein to avoid entangling during a compression or a decompression of the at least two coil springs, one of the coil springs is wound in an opposite direction from another of the coil springs, and
wherein the at least two coil springs includes three coil springs, wherein the longest coil spring has the smallest diameter, and wherein the longest coil spring having the smallest diameter is wound in a same direction as one of the coil springs having the largest diameter.

10. The brake system as recited in claim 9, wherein the vehicle is a motor vehicle.

11. The pedal-force simulator device as recited in claim 1, wherein at least one of the at least two coil springs has a variable spring constant.

12. The pedal-force simulator device as recited in claim 1, wherein the end face of the pressure plunger has a first annular stop shoulder including an end face, and a second annular stop shoulder having an end face, and wherein the first annular stop shoulder is allocated to a coil spring having a medium-sized diameter between the smallest diameter and the largest diameter and which is axially set apart from the coil spring having the medium-sized diameter, and wherein the second annular stop shoulder is allocated to the coil spring having the largest diameter and that is axially set apart from the coil spring having the largest diameter.

13. The pedal-force simulator device as recited in claim 1, wherein the axial length a first annular stop shoulder is selected so that an end face of the first annular stop shoulder and the coil spring having the medium-sized diameter have a predefinable distance from each other, and wherein the axial length of a second annular stop shoulder is selected so that an end face of the second annular stop shoulder and the coil spring having the largest diameter have a predefinable distance from each other.

14. The pedal-force simulator device as recited in claim 1, wherein the at least two coil springs are disposed coaxially to one another and have at least one of different lengths, different diameters, and different constant spring constants.

15. The pedal-force simulator device as recited in claim 1, wherein a longest one of the at least two coil springs is preloaded between the end face of the pressure plunger and a bearing plate, and wherein at least one other of the at least two coil springs is axially set apart from the end face of the pressure plunger.

16. The brake system as recited in claim 9, wherein the at least two coil springs are disposed coaxially to one another and have at least one of different lengths, different diameters, and different constant spring constants.

17. The brake system as recited in claim 9, wherein a longest one of the at least two coil springs is preloaded between the end face of the pressure plunger and a bearing plate, and wherein at least one other of the at least two coil springs is axially set apart from the end face of the pressure plunger.

\* \* \* \* \*